United States Patent Office 3,002,890
Patented Oct. 3, 1961

3,002,890
PROCESS FOR PREPARING PINEAPPLE STEM PHOSPHATASE ESSENTIALLY FREE OF PROTEASE ACTIVITY
Willis A. Gortner, Honolulu, Hawaii, assignor to Pineapple Research Institute of Hawaii, Honolulu, Hawaii, an association of Hawaii
No Drawing. Filed Nov. 25, 1957, Ser. No. 698,384
4 Claims. (Cl. 195—62)

The present invention relates to the production of an enzyme from pineapple stems which is rich in phosphatase activity but essentially free of protease activity.

Pineapple stem bromelain is a mixture of enzymes derived from the expressed or extracted juices of the stem of various species of the pineapple plant, as disclosed in the article, by R. M. Heinicke and W. A. Gortner, "Stem Bromelain, a New Protease Preparation From Pineapple Plants," in Economic Botany, in press, 1957. The preparations usually have appreciable acid phosphatase activity, accompanied by strong protease activity.

Some of the commercial uses for which a phosphatase enzyme can be employed require the presence of a protein. In such cases, protease activity is very undesirable because the enzyme would tend to act on the protein linkages and not merely on phosphate groups.

It is an object of the invention to provide a process for producing phosphatase enzyme from pineapple stem bromelain wherein the protease activity has been essentially eliminated, and to provide a novel product of such method.

It is a particular object of the invention to treat enzyme preparations from pineapple stem tissue under conditions of time, temperature, and acidity whereby the final product is rich in acid phosphatase but essentially devoid of protease activity.

I have discovered that the protease enzymes in the enzyme mixture derived from pineapple stems, in either the crude or fractionated form, are more susceptible to heat than the phosphatase enzyme present in the mixture, and that proper control of the time and temperature of heating will enable one to destroy the protease activity while still retaining substantial phosphatase activity.

The phosphatase of pineapple stems has an isoelectric point in the acid region. Less thermal destruction of the phosphatase and greater thermal destruction of the proteases will occur when the enzyme solution is made acidic and thus is near the isoelectric point of the phosphatase component. Accordingly, the differential heat treatment of the enzyme solution is conducted at an acid pH, the range pH 4 to 6.5 being most satisfactory from the standpoint of commercial practicality, but the desired preferential destruction of protease activity may also take place at other pH conditions, although with greater loss of yield in phosphatase activity.

Any temperature within the range of 60° to 100° C. will heat denature proteins and reduce protease activity in solutions of pineapple stem enzymes. The rate of heat transfer as well as the maximum temperature attained in the solution will affect the rapidity of protease destruction, a high temperature requiring only a few minutes and a lower temperature a much longer time for essentially complete protease destruction. Preferably, the enzyme solution is heated in a bath at 65° to 75° C., in which case 10 to 15 minutes will suffice to destroy protease activity and still leave substantial phosphatase activity. Prompt cooling is desirable to prevent further enzyme destruction. Other times and temperatures within the stated range can be used, selecting the time for any given temperature condition on the basis of the minimum time for essentially complete protease destruction.

The following specific example is illustrative of the invention, but it is to be understood that the invention is not to be limited thereto:

An acetone-precipitated pineapple stem bromelain powder was dissolved in water to give a concentration of 50 milligrams enzyme in 100 milliliters of water. The enzyme solution, having a pH of about 6, was heated in a constant temperature water bath for varying periods, immediately cooled then tested for activity. Milk-clotting activity in the presence of activating cysteine was used to detect protease in the samples; acid phosphatase activity was determined using p-nitrophenyl phosphate as substrate. The enzyme assays showed the following:

|  | Enzyme Units/Gm. Solids ||
|---|---|---|
|  | Protease | Phosphatase |
| Time at 70° C.: |  |  |
| 0 min | 2,783 | 25 |
| 15 min | 0 | 16 |
| Time at 65° C.: |  |  |
| 0 min | 2,895 | 24 |
| 5 min | 1,177 | 15 |
| 15 min | 70 | 15 |
| 30 min | 0 | 15 |

It will be observed that at either temperature, proper selection of the heating time resulted in complete elimination of protease activity with substantial phosphatase activity remaining.

The invention may be carried out with numerous deviations from the specific illustration, and such changes are contemplated within the scope of the appended claims.

I claim:
1. A process for preparing phosphatase enzyme from pineapple stem bromelain solutions, comprising adjusting the enzyme solution to an acid pH, followed by heating at a temperature between 60° and 100° C. for a period just sufficient to destroy protease activity, and cooling the solution.

2. A process for preparing phosphatase enzyme from pineapple stem bromelain solutions, comprising adjusting the enzyme solution to a pH in the range of 4 to 6.5, followed by heating at a temperature between 60° and 100° C. for a period just sufficient to destroy protease activity, and cooling the solution.

3. A process for preparing phosphatase enzyme from pineapple stem bromelain solutions, comprising adjusting the enzyme solution to a pH in the range of 4 to 6.5, heating the enzyme in solution at a temperature between 65° and 75° C. for about 10 minutes, and cooling the solution.

4. Pineapple stem phosphatase, substantially free of protease activity prepared in accordance with the process of claim 1.

References Cited in the file of this patent
UNITED STATES PATENTS
1,959,750  Wada _____ May 22, 1934

OTHER REFERENCES

Botanical Gazette 1905, vol. 39, pages 409–419, published by University of Chicago, pp. 409–412 particularly relied upon. (Available in the Smithsonian Library, Natural History Bldg., Washington, D.C.)

Enzymes by Waksman et al., The William & Wilkins Co., Baltimore (1926), p. 225 relied upon.

Journal of Biological Chemistry, vol. 119, pp. 35 to 46 (June–July 1937).

Industrial and Engineering Chemistry by Balls et al., vol. 33, No. 7, pp. 950–953, July 1941.

Methods in Enzymology, vol. II, by Colowick et al., Academic Press Inc., New York (1955) (pp. 62 and 63 relied on).